Jan. 29, 1935.   C. J. COBERLY   1,989,548
SEALING MEANS FOR SHAFTS
Filed July 18, 1932   2 Sheets-Sheet 1
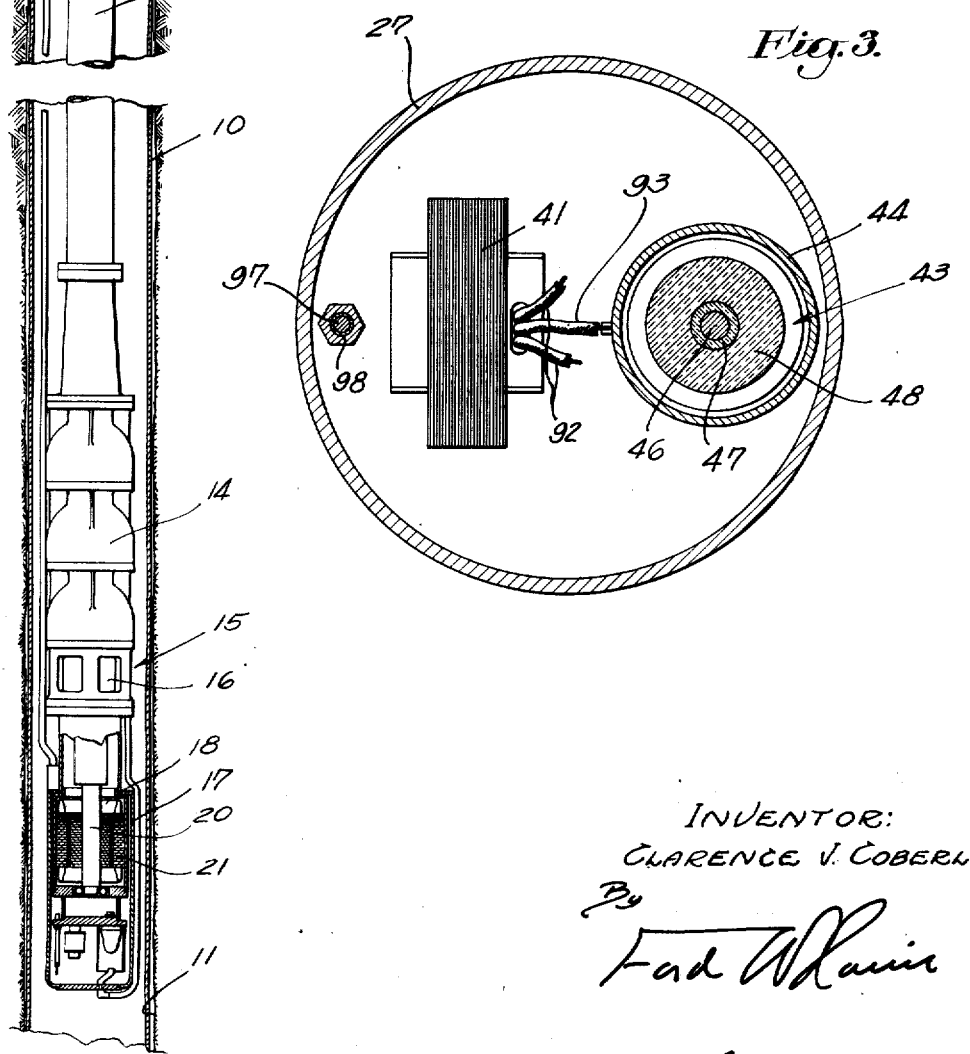
INVENTOR:
CLARENCE J. COBERLY,
By
Fad W Davis
ATTORNEY.

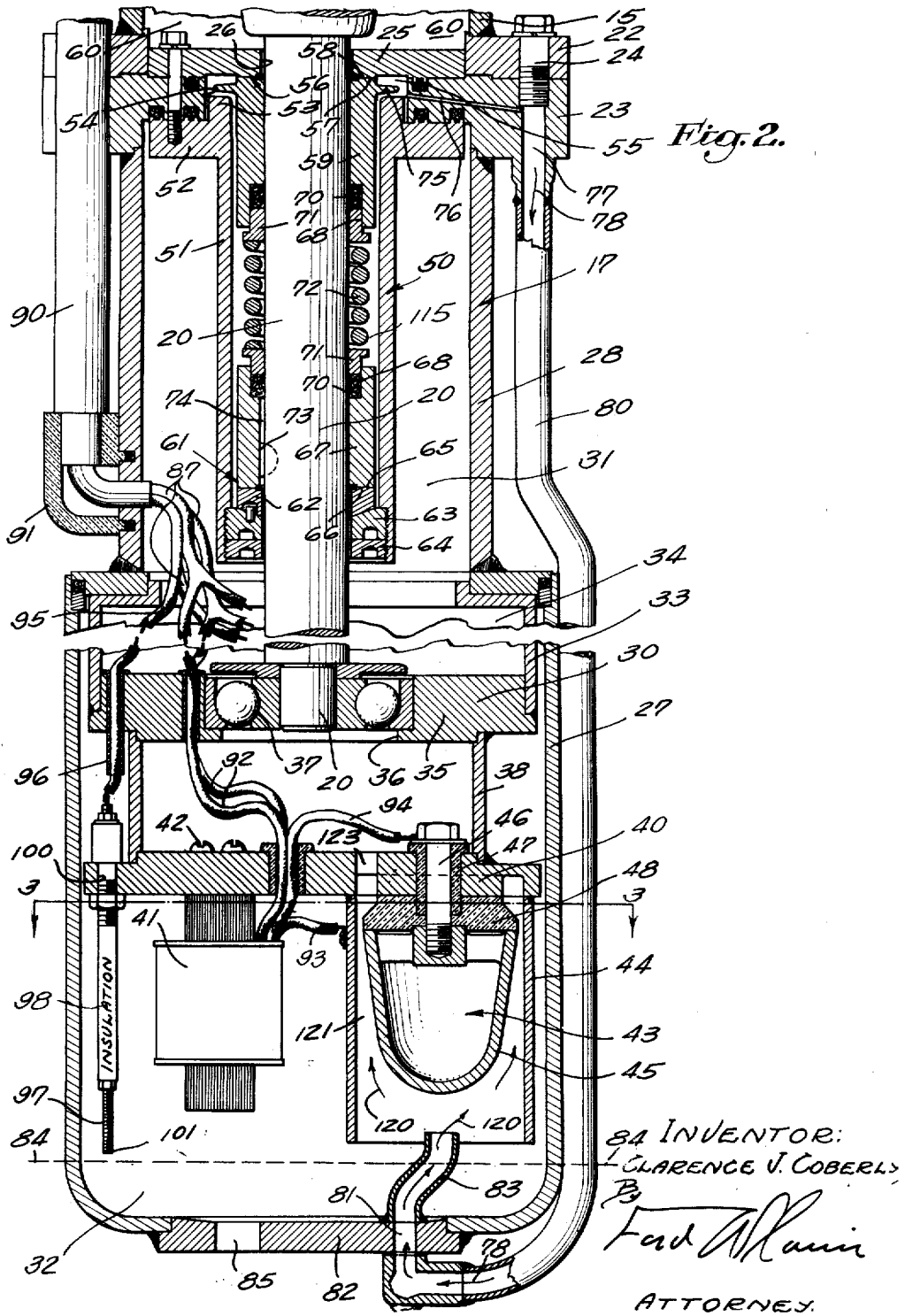

Patented Jan. 29, 1935

1,989,548

UNITED STATES PATENT OFFICE 1,989,548

SEALING MEANS FOR SHAFTS

Clarence J. Coberly, Los Angeles, Calif., assignor to Submersible Motor Pump Co., Ltd., Huntington Park, Calif., a corporation of California Application July 18, 1932, Serial No. 623,173

20 Claims. (Cl. 286—9)

My invention relates to a sealing means for use in conjunction with a shaft opening of a wall, and relates particularly to a sealing means for a shaft passing through such opening, adapted to prevent contamination or admixture of fluid on one side of the wall with fluid on the other side of the wall as a result of leakage of fluid through the shaft opening, or admixture of fluids due to the frictional contact of the faces of sealing members employed in connection with the shaft and shaft opening.

Where a shaft leaves a fluid-filled chamber or passes from one chamber filled with one fluid into a chamber filled with another fluid or into the open atmosphere, it is customary to employ a stuffing box with the idea of preventing leakage of fluid along the shaft from one body of fluid to the other. Such stuffing boxes ordinarily employ cooperating sealing faces which are in frictional engagement when the shaft is moved, as by rotation or reciprocation. It is found that some passage or leakage of fluid through the sealing means, although small, occurs; accordingly, stuffing boxes or sealing means of the ordinary type cannot be employed around shafts extending between chambers containing different fluids, one of which must be preserved from contamination by or admixture with the other of the fluids. For example, an electric motor, if placed in a tight chamber filled with a dry oil, may be operated in a position submerged in a body of water, and such operation may be maintained as long as water is kept from the oil chamber in which the electrical parts of the motor are contained. Ordinary stuffing boxes or packing boxes have been employed to seal around a shaft extending from the motor chamber, but it is found that such sealing means are not effective in preventing contamination of the oil in the motor chamber by water for an extended period of time. It is found that in a stuffing box, due to the frictional engagement of the sealing faces, an emulsion of oil and water is more or less slowly formed, which emulsion accumulates at the inner end of the sealing means and then settles in and contaminates the oil body, this contamination or admixture of water with the oil continuing until the water content is sufficient to destroy the insulating characteristics of the oil, with the result of burning out one or more of the electrical parts of the motor.

It is an object of my invention to provide a sealing device for use around a shaft which passes from a chamber containing one fluid into a space or chamber containing a second fluid which would contaminate the fluid in the first chamber, having means for carrying away from the junction of the shaft and the wall the fluid which may leak through the sealing faces or the emulsion of the several fluids produced by the proximity of the sealing faces, the entering or contaminating fluid being thereby prevented from contaminating the fluid of the chamber.

It is a further object of the invention to provide a sealing device of the character set forth in the preceding paragraph having a passage which connects the sealing device with the interior of the chamber, such passage having therein means for producing a flow of the admixture or emulsion of fluids formed at the sealing means through the passage, and means in the path of flow of the fluid for separating the contaminating fluid and preventing its entry into the body of fluid in the chamber which it is desired to keep uncontaminated. In the preferred form of my present invention prevention of contamination of an oil-filled chamber by water is accomplished by use of electrical separating means.

It is a further object of the invention to provide a sealing means for use in conjunction with a shaft which passes through a fluid-containing chamber into a space or chamber containing a second fluid which would contaminate the fluid of the chamber, together with means for conducting a flow of fluid, intermixture, or emulsion of fluids from the sealing device of the sealing means to a point within the chamber remote from the point where the shaft passes from the chamber in to the second fluid, and means in the chamber for preventing passage of the second or contaminating fluid, which has been carried into such remote portion of the chamber, into the main body of fluid in the chamber which it is desired to keep free from contamination by the second fluid.

In the preferred use of my invention the chamber is filled with oil, and such chamber is submerged or has the shaft outlet thereof in a body of aqueous fluid such as water. In the lower end of the chamber a water space is formed below the body of oil, which body of oil may surround electrical apparatus such as a motor or other means for operating the shaft. From the sealing device of the invention a passage is provided which conducts a flow of fluid for carrying the second or contaminating fluid, which may enter the upper portion of the chamber through the shaft opening, into the water space at the lower end of the chamber, and in the chamber between the water space and the main portion of the body of oil an electrical separating means is placed which is capable of breaking down any emulsions of oil and water which tend to rise into the main body of oil.

It is a further object of the invention to provide a device of the character set forth in the preceding paragraph having means for indicating when the level of water in the water space of the chamber has risen to a predetermined plane.

It is a further object of the invention to provide means which will at this time turn off the supply of electrical energy to such electrical parts as may be contained in the chamber.

Further objects and advantages of the invention will be made evident throughout the following part of the specification.

Referring to the drawings, which are for illustrative purposes only,

Fig. 1 is a view showing a deep well pump apparatus embodying my present invention, such apparatus being operated by a motor contained in a submerged chamber in a body of insulating fluid such as oil and protected by the new sealing means forming a part of my invention.

Fig. 2 is an enlarged vertically sectioned view showing the motor chamber and sealing means with their associated and cooperating parts.

Fig. 3 is a cross section on a plane represented by the line 3—3 of Fig. 2.

In Fig. 1 I show a well casing 10 extending downwardly into a well 11. By means of a water discharge column 12 which hangs from a discharge head 13 placed at the upper end of the casing 10, a rotary or centrifugal pump 14 is supported in the well, this pump having a water inlet fitting 15 at its lower end provided with inlet openings 16 and a motor casing or shell 17 secured to and extending downwardly from the fitting 15, this motor casing providing a chamber 18 into which the impeller shaft 20 of the pump 14 extends and on which shaft the rotary element of an electric motor 21 is mounted. As shown in Fig. 2, the water inlet fitting 15 of the pump 14 has a flange 22 to which a flange 23 at the upper end of the shell or motor casing 17 is secured by means such as bolts 24. To close the upper end of the motor casing 17, a circular plate 25 is secured to the inner portions of the flange 23, this plate having an opening 26 therein through which the shaft 20 extends into the motor casing 17. The lower portion 27 of the motor casing 17 is shown larger in diameter than the upper portion 28 thereof, and in the lower portion a wall structure 30 divides the motor casing into an oil chamber 31 at the upper portion thereof and a balance or water-receiving chamber 32 at the lower portion thereof. The wall structure 30 includes an upper cylindrical wall portion 33 which surrounds the space 34 in which the motor 21, shown only in Fig. 1, is situated. At the lower end of the cylindrical wall portion 33 is a horizontal wall 35 having a bore 36 in which a bearing 37 for the lower end of the shaft 20 is mounted. By means of a cylindrical wall 38 of smaller diameter than the wall portion 33, a horizontal wall 40 is secured below the horizontal wall 35. A step-up transformer 41 is secured to the lower face of the wall 40 by means of screws 42, and adjacent the transformer 41 an electrical dehydrator or separator 43 is mounted, this dehydrator comprising a downwardly projecting tubular metal wall 44 secured and grounded to the wall 40 whereby to form one of the electrodes of the dehydrator unit, and a dome-shaped, downwardly extending metal body 45 forming a live electrode and secured within the metal tube 44 by means of a screw 46, insulating members 47 and 48 being provided to insulate the member 45 and the screw 46 from the wall 40.

Projecting downwardly from the upper end of the shell 17 is a tubular wall structure 50 comprising a cylindrical wall 51 having a radial flange 52 near its upper end for securing it to the flange 23 of the shell 17 in such position that the upper end 53 of the cylindrical wall 51 projects into the bore 54 of the flange 23, leaving an annular space within the upper portion of the bore 54.

To prevent a free flow of fluid through the opening 26 of the wall 25, a sealing means 56 is provided at such opening 26 in the form of an annular face 57 on the inner portion of the wall 25 surrounding the opening 26 and the shaft 20, and a cooperating annular face 58 formed on the upper end of a body or sleeve 59 mounted on the shaft 20. It will be perceived that the upper end of the tubular wall structure is in communication with the sealing means 56 and through the sealing means 56 is in communication with the opening 26 and the space 60 above the wall 25. The lower end of the tubular wall structure 50 is in restricted communication with the oil in the oil chamber 31 through sealing means 61 comprising a stationary sealing ring 62 surrounding the shaft 20 and held within the lower end of the cylindrical wall 51 by means of threaded rings 63 and 64, such sealing ring 62 having an upwardly disposed annular face 65 adapted to be engaged by an annular face 66 formed at the lower end of a sleeve or body 67 mounted on the shaft 20 within the cylindrical wall 51. In the respective lower and upper ends of the sleeve members 59 and 67 counterbores 68 are provided in which packing material 70 is adapted to be compressed by gland members 71 actuated by a compression spring 72 which functions to force the members 59 and 67 toward the stationary annular sealing faces 57 and 65 with which they cooperate. The members 59 and 67 are mounted on the shaft so as to rotate therewith and to be axially slidable thereon, the means employed for this purpose preferably consisting of keys such as 73 mounted in the shaft 20 to engage splines such as 74 in the members 59 and 67.

It is characteristic of sealing means of the stuffing box type and of the character of the sealing means 56 that where such sealing means is employed between bodies of oil and aqueous fluids, an intermixture of the fluids, or a fine emulsification thereof, will take place due to the action of the frictionally engaging faces of the sealing means, such as the annular faces 57 and 58 of the sealing means 56.

In my invention I provide pumping means in the form of a radial flange 75 projecting from the upper portion of the sleeve member 59 into the annular space 55, which produces a centrifugal action in the emulsion of oil and water exuded from between the faces 57 and 58 into the annular space 55. The pumping effect produces an outward flow from the space 55 through a hole 76 which extends outwardly through the flange 23 to a downwardly directed hole 77 in the outer portion of the flange. As shown by arrows 78, this flow or circulation is carried through a pipe member 80 to an opening 81 in the bottom wall 82 of the shell 17, and upwardly through a short nipple 83 into the dehydrator 43. In Fig. 2 the level of the body of oil in the shell 17 is indicated by a broken line 84. In the installation of the shell 17 and its contained equipment, the quantity of oil therein substantially fills the entire space within the shell. Through a pressure balancing opening 85 in the bottom 82 water may enter and leave the lower portion or water-receiving chamber 32 formed at the lower end of the shell as the volume of oil within the shell 17 changes.

In the form of the invention shown, three wires 87 are carried from a switch 88 through a conduit 90 extending along the exterior of the discharge column 12 and the pump 14, as shown in Fig. 1, to a water-tight inlet fitting 91 mounted on the shell 17. The lower ends of the wires 87 are connected to the motor 21, and from two of the wires 87 leads 92 are carried to the transformer 41 which has high potential secondary wires 93 and 94 extending therefrom, respectively connected to the electrodes 44 and 45 of the dehydrator 43, as shown. A fourth wire 95 is also carried through the conduit 90 into the interior of the shell 17 where it passes through an insulated tube 96 mounted in the horizontal wall 35 to a vertical bar 97 carried in a tube of insulating material 98 secured in an opening 100 in the peripheral portion of the horizontal wall 40 which also supports the dehydrator 43. The bar or electrode 97 forms part of a means for automatically turning off the electrical system by opening the switch 88 and for producing a sensible indication or signal when the level 84 of the water in the water-receiving chamber 32 reaches the lower end 101 of the electrode 97 thus preventing a rise of this level to the transformer 41 or to the live electrode 45. As part of this means I have in Fig. 1 shown the upper end of the wire 95 extending to a releasing coil 103 for opening the switch 88, the coil 103 being connected through a wire 104 to one of the outgoing terminals 87 of the switch 88. Through a conductor 106 the wire 95 also connects with a bell 107 which is connected through a conductor 108 with a feed wire 110 leading to the switch 88. Another of the feed wires, such as 111, is grounded in accordance with standard practice, as indicated at 112. Should loss of oil from the shell 17 from any cause or diminution in the body of oil within the shell 17 result in the water level 84 reaching the lower end 101 of the electrode 97, the circuit comprising the wire 95 will be grounded, and current will flow through the releasing coil 103 for a sufficient length of time to cause the switch 88 to open, and current will also flow through the bell 107 and produce a sensible indication or signal that the electrical system has been turned off due to the rise of the water level in the lower part of the casing 17 to the maximum predetermined by the position of the lower end 101 of the electrode 97.

Due to the centrifugal effect in the space 55 at the upper end of the tubular wall structure 50, a slight suction is placed on the interior space 115 thereof, with the result that any movement of oil through the sealing means 61 will be outward between the faces 65 and 66 into the lower end of the space 115. It will be perceived that the utility of the sealing means 61 is principally to restrict upward circulation of oil through the tubular wall structure 50 to a very small quantity and that the device will operate without the sealing means 61 but with the lower end of the cylindrical wall 51 entirely open. Any movement of fluid through the tubular wall structure is upward toward the space 55 and thence outward in the space 55. Accordingly, all possibility of contaminating fluid or water passing downwardly through the space 115 into the oil in the chamber 31 is avoided. The result of the cooperation of the parts shown is that the contaminating fluid is carried from the space 55 through the opening 76 and the tube 80 to the lower end of the shell 17 where it may separate or be separated from the oil contained in the circulating flow. Should the particles of water carried from the space 55 be of sufficient size to gravitate from the oil, such water will immediately settle into the water-receiving chamber 32 upon leaving the upper end of the delivery tube 83. Fine emulsions of water and oil may pass upwardly from the delivery tube 83, as indicated by arrows 120, into the annular space 121 of diminishing area between the electrodes 44 and 45, wherein such emulsions are broken down by the high potential electrical field between the electrodes 44 and 45. As a result of the electric dehydrating action, the water content of the emulsion settles through the oil and combines with the body of water in the water-receiving chamber 32; therefore, dry oil alone can pass upwardly through the opening 123 through which the upper portion of the dehydrator 43 communicates with the lower end of the oil chamber 31.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A device of the character described, for use with a fluid-filled chamber having a shaft projecting through an opening exposed to a second fluid exterior of said chamber, including: sealing means resisting entry of said second fluid through said opening into said chamber; walls forming a passage leading from said sealing means through which a fluid flow away from said sealing means is produced; and means for establishing an electric field receiving said fluid flow for removing therefrom the therein contained second fluid.

2. A submersible structure including in combination: a shell means providing a chamber containing a first fluid there being a second fluid exterior of said shell means; a shaft projecting from said shell means and into said second fluid whereby an intermixture of said fluids is formed at the junction of said shaft and said shell means when said shaft moves; separating means receiving said intermixture and acting to coalesce the particles of said second fluid in said intermixture; walls defining a receiving chamber containing bodies of said fluids and receiving the coalesced particles of said second fluid; control means for said submersible structure; and means responsive to the amount of second fluid in said receiving chamber for actuating said control means when a predetermined amount of said second fluid is in said receiving chamber.

3. A device of the character described, for use with a liquid-filled chamber having a shaft projecting through an opening exposed to a second liquid exterior of said chamber, including: sealing means resisting entry of said second fluid through said opening into said chamber and forming an emulsion of said liquids; walls forming a passage leading from said sealing means; pumping means for producing a flow of said emulsion through said passage in a direction away from said sealing means; and electrical separating means receiving said emulsion for coalescing and removing therefrom the therein contained second liquid.

4. A device of the character described, for use with a fluid-filled chamber having a shaft projecting through an opening exposed to a second fluid exterior of said chamber, including: sealing means resisting entry of said second fluid through said opening into said chamber; walls forming a passage leading from said sealing means through which a fluid flow away from said sealing means is produced; electrical separating means receiving said fluid flow for removing therefrom the therein contained second fluid; walls forming a receiving chamber; means for conducting from said separating means to said receiving chamber the quantities of second fluid removed by said separating means from said fluid flow; switch means energizing said electrical separating means; and means actuated by said second fluid in said receiving chamber, when the volume of said second fluid in said receiving chamber has reached a prescribed quantity for automatically opening said switch means.

5. A device of the character described, for use with a fluid-filled chamber having a shaft projecting through an opening exposed to a second fluid exterior of said chamber said chamber containing electrical apparatus energized through a switch means, including: sealing means resisting entry of said second fluid through said opening into said chamber; walls forming a passage leading from said sealing means through which a fluid flow away from said sealing means is produced; separating means receiving said fluid flow for removing therefrom the therein contained second fluid; walls forming a receiving chamber; means for conducting from said separating means to said receiving chamber the quantities of second fluid removed by said separating means from said fluid flow; and means for automatically opening said switch means when the volume of said second fluid in said receiving chamber has reached a prescribed quantity.

6. A device of the character described, for use with a fluid-filled chamber having a shaft projecting through an opening exposed to a second fluid exterior of said chamber, including: sealing means resisting entry of said second fluid through said opening into said chamber; a tubular wall surrounding said shaft within said chamber, one end of said tubular wall communicating with the fluid of said chamber and the other end of said tubular wall forming a space around the inner part of said sealing means; walls forming a passage leading from said space formed around said sealing means, through which a fluid flow away from said sealing means is produced; and electrical separating means receiving said fluid flow for removing therefrom the therein contained second fluid.

7. A device of the character described, for use with a fluid-filled chamber having a shaft projecting through an opening exposed to a second fluid exterior of said chamber, including: sealing means resisting entry of said second fluid through said opening into said chamber; a tubular wall surrounding said shaft within said chamber, one end of said tubular wall communicating with the fluid of said chamber and the other end of said tubular wall forming a space around the inner part of said sealing means; walls forming a passage leading from said space formed around said sealing means; pumping means for producing a fluid flow through said passage in a direction away from said sealing means; and electrical separating means receiving said fluid flow for removing therefrom the therein contained second fluid.

8. A device of the character described, for use with a fluid-filled chamber having a shaft projecting through an opening exposed to a second fluid exterior of said chamber, including: sealing means resisting entry of said second fluid through said opening into said chamber; walls forming a passage leading from said sealing means through which a fluid flow away from said sealing means is produced; a transformer in the fluid of said fluid-filled chamber; electric conductor means extending from the exterior of said fluid-filled chamber to said transformer; electrical separating means connected to said transformer comprising essentially an electrical dehydrator receiving said fluid flow for removing therefrom the therein contained second fluid; walls forming a receiving chamber at the lower end of said fluid-filled chamber; means for conducting from said separating means the quantities of second fluid removed by said separating means from said fluid flow; and means connecting said separating means with said first named chamber for recombining the remainder of said fluid flow with the fluid in said chamber.

9. A device of the character described, for use with a fluid-filled chamber having a shaft projecting through an opening exposed to a second fluid exterior of said chamber, including: sealing means resisting entry of said second fluid through said opening into said chamber; walls forming a passage leading from said sealing means through which a fluid flow away from said sealing means is produced; a transformer in the fluid of said fluid-filled chamber; electric conductor means extending from the exterior of said fluid-filled chamber to said transformer; separating means connected to said transformer comprising essentially an electric dehydrator receiving said fluid flow for removing therefrom the therein contained second fluid; walls forming a receiving chamber; means for conducting from said separating means the quantities of second fluid removed by said separating means from said fluid flow; and electrical means actuated by said second fluid in said receiving chamber, for de-energizing said transformer when the volume of said second fluid in said receiving chamber has reached a prescribed quantity.

10. A device of the character described, for use with an oil-filled chamber having a shaft projecting through an opening exposed to a body of water exterior of said chamber, including: walls forming a passage leading from said opening through which a fluid flow away from said opening may occur; and electric separating means in the form of an electric dehydrator receiving said fluid flow for coalescing and removing therefrom the therein contained water.

11. A device of the character described, for use with an oil-filled chamber having a shaft projecting through an opening exposed to a second fluid containing water, including: sealing means resisting entry of said second fluid through said opening into said chamber; walls forming a passage leading from said sealing means through which a fluid flow away from said sealing means is produced; and electrical separating means in the form of an electric dehydrator establishing an electric field receiving said fluid flow for removing therefrom such water as may have worked through said sealing means from the exterior of said chamber.

12. A device of the character described, for use with a fluid-filled chamber having a shaft projecting through an opening exposed to a second fluid exterior of said chamber, including: sealing means resisting entry of said second fluid through said opening into said chamber; walls forming a passage leading from said sealing means through which a fluid flow away from said sealing means is produced; pumping means for producing a flow of fluid from said chamber toward said sealing means and outwardly from said sealing means through said passage; electrical separating means receiving said fluid flow for removing therefrom the therein contained second fluid; and means connecting said operating means with said fluid-filled chamber for returning the first fluid of said fluid flow to said fluid-filled chamber.

13. A device of the character described for use with a fluid-filled chamber having a movable shaft projecting through an opening exposed to a second fluid exterior of said chamber whereby an intermixture of said fluids is formed when said shaft is moving, said device including: drive means for said shaft; separating means receiving said intermixture and separating the same into its constituent fluids; walls defining a receiving chamber receiving the constituents from said separating means and containing bodies of both fluids; and means for shutting down said drive means when the level of said second fluid in said receiving chamber reaches a predetermined elevation to prevent formation of further intermixture.

14. In combination: a stationary member; a movable shaft extending adjacent said stationary member one end of the junction of said members communicating with a body of a first liquid and the other end of said junction communicating with a body of a second liquid whereby an emulsion of said liquids is formed at said junction when said movable member is moved; and an electric separating means receiving said emulsion and acting to coalesce the liquid particles of said second liquid in said emulsion whereby said coalesced particles separate from the first liquid of said emulsion which first liquid is conducted to said body of first liquid communicating with said one side of said junction.

15. In combination: a stationary member; a movable shaft extending adjacent said stationary member one end of the junction of said members communicating with a body of a first liquid and the other end of said junction communicating with a body of a second liquid whereby an emulsion of said liquids is formed at said junction when said movable member is moved; and means for establishing an electric field into which said emulsion moves, said electric field removing said second liquid from said emulsion leaving said first liquid, there being means for conducting this separated first liquid to said body of first liquid with which said one end of said junction communicates.

16. In combination: a shell containing a first fluid; a shaft extending from said shell, the junction of said shaft and said shell communicating at one end with said first fluid and at the other end with a second fluid in which said shell is submerged whereby said fluids tend to intermix at said junction when said shaft is moving; walls forming a chamber in said shell containing contacting bodies of said fluids, the body of said first fluid in said chamber communicating with said first fluid in said shell; and separating means capable of coalescing the second fluid in said intermixture and receiving said intermixture to coalesce the constituent second fluid, said separating means communicating with said chamber to supply the constituent first fluid to said body of first fluid in said chamber and to supply the coalesced second fluid to said body of second fluid in said chamber.

17. In combination with a movable member: a stationary wall adjacent which said movable member moves to provide a junction one end of which communicates with a body of primary liquid and the other end of which communicates with a body of secondary liquid whereby an emulsion of said liquids forms at said junction when said movable member is moving; means for establishing an electric field of sufficient intensity to coalesce the particles of said secondary liquid in said emulsion into masses of sufficient size to gravitate from the primary liquid; and walls forming a chamber containing a portion of said body of primary liquid and containing a body of said secondary liquid, the coalesced secondary liquid of said emulsion moving into said body of secondary liquid and the primary liquid of said emulsion returning to said body of primary liquid.

18. In combination with a movable member: a stationary member adjacent said movable member and cooperating therewith in defining a junction one end of which communicates with an oil and the other of which communicates with an electrically conducting liquid whereby an emulsion of said oil and said electrically conducting liquid is formed at said junction when said movable member is moving; walls defining a chamber containing bodies of said oil and said electrically conducting medium separating at a surface of contact; and means for establishing an electric field in said chamber, said means including a live electrode positioned in spaced relation with respect to said surface of contact, said emulsion being treated by said field to conduct the electrically conducting liquid therein to said body of electrically conducting liquid in said chamber.

19. A combination as defined in claim 18 in which said body of electrically conducting liquid in said chamber is in communication with the electrically conducting liquid with which said other end of said junction communicates.

20. In combination with a shell containing a body of dielectric liquid: a shaft extending through an opening of said shell and into a moisture-containing zone whereby movement of said shaft forms an emulsion; a transformer in said shell; and means electrically connected to said transformer for establishing an electric field in said shell receiving said emulsion and coalescing the moisture droplets therein into masses of sufficient size to settle from said dielectric liquid in said emulsion, said moisture settling to the bottom of said shell to form a body of conducting liquid.

CLARENCE J. COBERLY.

CERTIFICATE OF CORRECTION.

Patent No. 1,989,548. January 29, 1935.

CLARENCE J. COBERLY.

It is hereby certified that error appears in the printed specification of the above numbered patent requiring correction as follows: Page 5, first column, line 18, claim 12, for "operating" read separating; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents.